United States Patent Office 3,813,264
Patented May 28, 1974

3,813,264
ELECTROCONDUCTIVE PAPER
Jerry Emile Boothe, Pittsburgh, Andrew Jackson Sharpe, Jr., McMurray, and Kathleen Ann Seese, Carnegie, Pa., assignors to Calgon Corporation, Robinson Township, Pa.
No Drawing. Filed Mar. 22, 1972, Ser. No. 236,969
Int. Cl. B44d 1/00; G03g 7/00
U.S. Cl. 117—201
4 Claims

ABSTRACT OF THE DISCLOSURE

An electroconductive paper useful in making copies by an electrostatic process is made by incorporating therein an N-(alkyl ammonium)acrylamide polymer having about 90 weight percent units of the formula

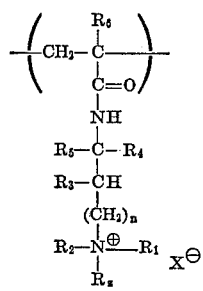

where $R_1$ and $R_2$ are independently selected from linear and branched alkyl groups having up to 18 carbon atoms and aralkyl groups having up to 10 carbon atoms and in which $R_1$ and $R_2$ may be combined to form a heterocyclic group having one or more hetero atoms; $R_3$ is selected from the group consisting of hydrogen, lower alkyl groups of 1 to 4 carbon atoms and halogen; $R_4$ is selected from the group of hydrogen, halogen, and linear or branched alkyl groups of up to 5 carbon atoms; $R_5$ is selected from the group consisting of phenyl, lower alkyl groups of 1 to 4 carbon atoms and substituted phenyl wherein the substituents may be lower alkyl groups of 1 to 4 carbon atoms or lower alkoxy groups of 1 to 4 carbon atoms; $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from the group consisting of hydrogen and methyl; $R_z$ may be any group capable of quaternizing the nitrogen, preferably selected from the group consisting of hydrogen, benzyl, phenethyl, cyanoethyl, and linear, branched and substituted alkyl and aralkyl groups; $X^\ominus$ is any anion, especially halide, alkosulfate, tosylate, carboxylate, sulfonate, sulfate, phosphate, acetate, nitrate, etc.; and $n$ is an integer of 0 to 2.

BACKGROUND OF THE INVENTION

This invention is directed to electroconductive paper and particularly to electroconductive paper useful in electrostatic image reproduction techniques and which has as the conductive layer a coating of certain N-(alkyl ammonium) acrylamide polymers.

Electroconductive paper has been used in the past to distribute electrical stresses in various insulating products. See, for example, U.S. Pat. 3,148,107. In addition, electroconductive paper has been used for nonimpact reproduction. See, for example, Vaurio and Fird, "Electrically Conductive Paper for Nonimpact Printing," TAPPI, December 1964, vol. 47, No. 12, pp. 163A–165A. See also, Chemical & Engineering News, July 20, 1964, pp. 88–89. This product is also disclosed in U.S. Pat. 3,052,539. For other patents relating to conductive paper for electrostatic reproduction, see Gess U.S. Pats. 3,216,-853 and 3,264,137.

The most commonly used conductive polymers are high molecular weight, water-soluble, cationic polymers. See, for example, Boothe et al., U.S. Pa. 3,544,318; Schaper et al., U.S. Pat. 3,486,932; and Zeh U.S. Pat. 3,551,384. See also, McNamee et al., U.S. Pat. 3,617,372 and Taubman, U.S. Pat. 3,615,408. In addition, see the paper entitled "Performance-Structure Relationships of Electroconductive Polymers" by M. F. Hoover and H. E. Carr, TAPPI, December 1968, vol. 51, No. 12, and the paper entitled "Electroconductive Polymers" by R. J. Dolinski and W. R. Dean, Chem Tech, May 1971.

SUMMARY OF THE INVENTION

We have discovered that certain N-(alkyl ammonium) acrylamide polymers are of special value in providing a paper substrate with an electroconductive coating. According to our invention, the polymers will generally have a molecular weight sufficient to form clear, self-supporting films of about one half to two microns when dried from a dilute solution. The polymers of our invention comprise at least about 90 percent of groups of the following formula

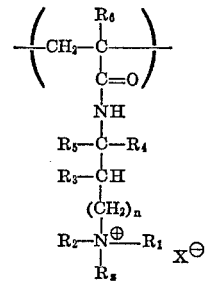

where $R_1$ and $R_2$ are independently selected from linear and branched alkyl groups having up to 18 carbon atoms and aralkyl groups having up to 10 carbon atoms and in which $R_1$ and $R_2$ may be combined to form a heterocyclic group having one or more hetero atoms; $R_3$ is selected from the group consisting of hydrogen, lower alkyl groups of 1 to 4 carbon atoms and halogen; $R_4$ is selected from the group of hydrogen, halogen, and linear or branched alkyl groups of up to 5 carbon atoms; $R_5$ is selected from the group consisting of phenyl, lower alkyl groups of 1 to 4 carbon atoms and substituted phenyl wherein the substituents may be lower alkyl groups of 1 to 4 carbon atoms or lower alkoxy groups of 1 to 4 carbon atoms; $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms. $R_6$ is selected from the group consisting of hydrogen and methyl; "$R_z$ may be any group capable of quaternizing the nitrogen, preferably selected from the group consisting of hydrogen, benzyl, phenethyl, cyanoethyl, and linear, branched and substituted alkyl and aralkyl groups; $X^\ominus$ is any anion, especially halide, alkosulfate, tosylate, carboxylate, sulfonate, sulfate, phosphate, acetate, nitrate, etc.; and $n$ is an integer of 0 to 2.

The preferred polymers of our invention are when $R_1$, $R_2$, $R_4$, $R_5$, and $R_z$ are lower alkyl groups of 1 to 4 carbon atoms and $R_3$ and $R_6$ are hydrogen; $n$ is 0 or 1 and $X^\ominus$ is a halide. The most preferred polymers are when $R_1$, $R_2$ $R_4$, $R_5$, and $R_z$ are methyl and $R_3$ and $R_6$ are hydrogen and $n$ is 0 or 1 and $X^\ominus$ is chloride. The preferred polymers of our invention may be represented by the following formula

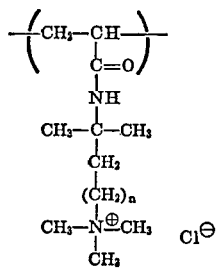

When $n$ equals 0, the polymer is poly 2-acrylamido-2-methyl propyl trimethyl ammonium chloride (AMPTAC) and when $n$ equals 1, the polymer is poly 3-acrylamido-3-methyl butyl trimethyl ammonium chloride (AMBTAC).

The polymers of our invention are the subject of several copending applications. See the applications of J. E. Boothe and A. J. Sharpe, Jr., entitled "Novel Cationic Polymers" and "Novel Cationic Acrylamido Monomers and Methods of Making Them" both filed Mar. 2, 1972. In addition, see the application of J. E. Boothe, A. J. Sharpe, Jr., and N. Grier, entitled "Novel Cationic Monomers and Methods of Making Them," Ser. No. 197,517 and filed Nov. 10, 1971.

Water-soluble copolymers containing at least 90 percent of the above described N-(alkyl ammonium) acrylamides are contemplated within the scope of our invention. Any copolymerizable monomer which will form a water-soluble polymer may be used. The preferred copolymerizable monomers are acrylamide, diacetone acrylamide, N-methylol acrylamide, N-vinyl pyrrolidine, the di lower alkyl diallyl quaternary ammonium monomers as described in U.S. Pats. 3,544,318 and 3,288,770 and the substituted acrylics as described in U.S. Pat. 3,486,932, An especially preferred class of comonomers are the N-(alkyl amino) acrylamides which are described in the above copending applications.

The polymers of our invention may be prepared by using any of the standard polymerization techniques. We have prepared polymers using the emulsion suspension, and solution polymerization and by employing various free radical catalysts. As is reailzed by one skilled in the art, there are many ways of preparing the polymers.

As mentioned above, the polymers of our invention are employed in the preparation of electroconductive paper. The polymers may be applied to the paper or cellulose web by the conventional methods used for that purpose, e.g., coating, dipping, brushing, or by wet end addition, etc. The amount of polymer applied to the paper will generally vary within the range of about 0.5 to 3.0 pounds per 3,000 square feet, depending upon the particular polymer and paper combination used and the degree of electroconductivity which is desired. In some cases, it will be desirable to use as little as 0.1 pounds per 3,000 square feet. There seems to be no operative upper limit to the amount of polymer applied, except to the extent this is determined by economics and engineering considerations. Therefore, it should be appreciated and understood that the overall range of from about 0.1 to about 3.0 pounds per 3,000 square feet is simply a statement of the preferred amount of polymer that should be used to obtain sufficient conductivity.

The polymers were evaluated by testing the surface resistivity of paper coated with the polymer. The following method was employed to test the resistance to flow of electrical current across the surface of a flat piece of paper.

A solution of the polymer to be tested was prepared and filmed on paper suitable for applying electroconductive coatings (such as Bergstrom's copy paper base stock 20 pounds/ream) by means of a Meyer wire-wound draw rod. The amount of polymer actually coated can thus be varied by the size of the draw rod used.

The coated paper is then dried in an oven at 105° C. until dry to the touch. The coated paper is then conditioned in a constant conditions room for at least 16 hours.

The coated paper is placed into a controlled environmental chamber at the desired relative humidity and again conditioned for 24 hours.

The coated paper is then placed into the Keithley Resistivity Adapter, coated side down, a voltage (usually about 100 v.) is applied, and the electrical current passing across the surface (surface resistivity) of the sheet is read using a Keithley Electrometer.

The electrical current is read in amperes and the following formula is used to find surface resistivity:

$$\text{Surface resistivity in ohms/square} = 53.4 \times \frac{V}{A}$$

V = applied D.C. voltage
A = (electrometer reading) in amperes

Table I shows the results for the evaluation of poly 3-acrylamido-3-methyl butyl trimethyl ammonium chloride (AMBTAC) and poly 2-acrylamido-2-methyl propyl trimethyl ammonium chloride (AMPTAC).

TABLE I

| Polymer | Polymer coat weight in lbs./3,000 ft.² | Surface resistivity 23% RH in ohms/square |
|---|---|---|
| AMBTAC | 0.43 | $2.4 \times 10^{13}$ |
| AMBTAC | 0.58 | $3.3 \times 10^{12}$ |
| AMBTAC | 0.76 | $1.3 \times 10^{12}$ |
| AMBTAC | 0.83 | $1.1 \times 10^{12}$ |
| AMBTAC | 0.88 | $5.6 \times 10^{11}$ |
| AMBTAC | 0.94 | $3.0 \times 10^{11}$ |
| AMBTAC | 1.84 | $2.2 \times 10^{11}$ |
| AMPTAC | 0.26 | $2.8 \times 10^{14}$ |
| AMPTAC | 0.42 | $5.6 \times 10^{13}$ |
| AMPTAC | 0.43 | $2.1 \times 10^{13}$ |
| AMPTAC | 0.54 | $7.5 \times 10^{12}$ |
| AMPTAC | 0.57 | $2.4 \times 10^{12}$ |
| AMPTAC | 0.73 | $5.7 \times 10^{11}$ |
| AMPTAC | 0.85 | $3.8 \times 10^{11}$ |

We have also tested the solvent holdout properties of our polymers. As is recognized by one skilled in the art, solvent holdout is an important property for conductive polymers. The polymers should impart superior barrier properties to the conductive layer and paper substrate so that the solvent from the application of the photoconductive upper layer does not diffuse into the conductive layer or paper substrate. We evaluated the polymers of our invention by measuring the time it took for a solvent to penetrate the paper substrate. The solvent had a dye dissolved in it. The results are shown in Table II for poly 3-acrylamido-3-methyl butyl trimethyl ammonium chloride (AMBTAC).

TABLE II

| Polymer coat weight in lbs./3,000 ft.² | Solvent holdout in seconds | |
|---|---|---|
| | Toluene | Kerosene |
| 0.36 | 50 | 20 |
| 0.52 | 60 | 25 |
| 0.92 | 85 | 40 |
| 1.16 | 85 | 40 |

We claim:

1. An electroconductive paper consisting essentially of a paper substrate having a coating of an electroconductive polymer consisting of at least about 90 percent by weight of groups selected from the formula

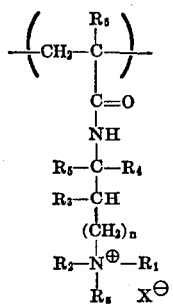

where $R_1$ and $R_2$ are independently selected from linear and branched alkyl groups having up to 18 carbon atoms and aralkyl groups having up to 10 carbon atoms and in which $R_1$ and $R_2$ may be combined to form a heterocyclic group having one or more hetero atoms; $R_3$ is selected from the group consisting of hydrogen, lower alkyl groups of 1 to 4 carbon atoms and halogen; $R_4$ is selected from the group consisting of hydrogen, halogen, and linear or branched alkyl groups of up to 5 carbon atoms; $R_5$ is selected from the group consisting of phenyl, lower alkyl groups of 1 to 4 carbon atoms and substituted phenyl wherein the substituents may be lower alkyl groups of 1 to 4 carbon atoms or lower alkoxy groups of 1 to 4 carbon atoms; $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from the group consisting of hydrogen and methyl; $R_z$ is any group capable of quaternizing the nitrogen; $X^\ominus$ is an anion and $n$ is an integer of 0 to 2.

2. An electroconductive paper as in claim 1 wherein $R_1$, $R_2$, $R_4$, $R_5$ and $R_z$ are lower alkyl groups of 1 to 4 carbon atoms; $R_3$ and $R_6$ are hydrogen; $X^\ominus$ is a halide and $n$ is 0 or 1.

3. An electroconductive paper as in claim 1 wherein $R_1$, $R_2$, $R_4$, $R_5$ and $R_z$ are methyl and $R_3$ and $R_6$ are hydrogen; $X^\ominus$ is chloride and $n$ is 0.

4. An electroconductive paper as in claim 1 wherein $R_1$, $R_2$, $R_4$, $R_5$, and $R_z$ are methyl and $R_3$ and $R_6$ are hydrogen; $X^\ominus$ is chloride and $n$ is 1.

References Cited
UNITED STATES PATENTS

| | | | |
|---|---|---|---|
| 3,666,810 | 5/1972 | Hoke | 260—561 N |
| 3,640,766 | 2/1972 | Jursich | 117—201 |
| 3,617,372 | 11/1971 | McNamee | 117—201 |
| 3,544,318 | 12/1970 | Boothe | 117—201 |
| 2,567,836 | 9/1951 | Anthes | 260—561 N |
| 2,980,657 | 4/1961 | Melamed | 260—89.7 N |

LEON D. ROSDOL, Primary Examiner

M. F. ESPOSITO, Assistant Examiner

U.S. Cl. X.R.

252—500; 96—1.5 R